(12) United States Patent
Hosotani

(10) Patent No.: US 9,548,662 B2
(45) Date of Patent: Jan. 17, 2017

(54) SWITCHING POWER-SUPPLY CIRCUIT

(71) Applicant: Murata Manufacturing Co., Ltd., Nagaokakyo-shi, Kyoto-fu (JP)

(72) Inventor: Tatsuya Hosotani, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 176 days.

(21) Appl. No.: 13/900,721

(22) Filed: May 23, 2013

(65) Prior Publication Data
US 2013/0250626 A1  Sep. 26, 2013

Related U.S. Application Data

(63) Continuation of application No. PCT/JP2011/076481, filed on Nov. 17, 2011.

(30) Foreign Application Priority Data

Dec. 2, 2010 (JP) ................................. 2010-268885

(51) Int. Cl.
*H02M 3/335* (2006.01)
*H02M 7/5387* (2007.01)

(52) U.S. Cl.
CPC ..... *H02M 3/33507* (2013.01); *H02M 3/33553* (2013.01); *H02M 3/33561* (2013.01); *H02M 3/33576* (2013.01)

(58) Field of Classification Search
CPC .................. H02M 3/33553; H02M 3/33507; H02M 3/33576; H02M 3/33561
(Continued)

(56) References Cited

U.S. PATENT DOCUMENTS 6,130,828 A * 10/2000 Rozman ............ H02M 3/33561
 363/21.06
6,504,267 B1  1/2003 Giannopoulos
(Continued)

FOREIGN PATENT DOCUMENTS

JP  63-133867 A  6/1988
JP  03-007062 A  1/1991
(Continued)

OTHER PUBLICATIONS

Official Communication issued in International Patent Application No. PCT/JP2011/076481, mailed on Dec. 27, 2011.

*Primary Examiner* — Timothy J Dole
*Assistant Examiner* — Sisay G Tiku
(74) *Attorney, Agent, or Firm* — Keating & Bennett, LLP

(57) ABSTRACT

A switching power-supply circuit includes a transformer, a first switching element, a first rectifying/smoothing circuit generating a first output voltage by rectifying and smoothing the output of a first secondary winding, a second rectifying/smoothing circuit generating a second output voltage by rectifying and smoothing the output of a second secondary winding, a first feedback circuit generating a feedback signal according to the first output voltage, and a first switching control circuit. When the voltage of the second secondary winding is greater than the second output voltage and the second output voltage is less than the voltage of a reference-voltage circuit, a second rectifier circuit turns on a rectifier switch element, and stabilizes the second output voltage by controlling the number of pulses per unit time in a pulse current flowing through the second rectifier circuit.

23 Claims, 10 Drawing Sheets

(58) Field of Classification Search
USPC ........... 363/16, 21.01–21.09, 67, 69, 84, 98, 95,363/97
See application file for complete search history.

(56) References Cited

U.S. PATENT DOCUMENTS

| | | | | |
|---|---|---|---|---|
| 2001/0017780 | A1* | 8/2001 | Hosotani | ........... H02M 3/33561 363/16 |
| 2001/0019489 | A1 | 9/2001 | Hosotani et al. | |
| 2002/0141206 | A1* | 10/2002 | Brkovic | ................ H02M 1/088 363/24 |
| 2003/0218892 | A1* | 11/2003 | Nakagawa | ........ H02M 3/33569 363/56.12 |
| 2005/0099827 | A1* | 5/2005 | Sase | ................ H02M 3/33592 363/16 |
| 2006/0119185 | A1* | 6/2006 | Steigerwald | ...... H02M 3/33561 307/75 |
| 2006/0158908 | A1* | 7/2006 | Usui | ................ H02M 3/33561 363/15 |
| 2006/0181230 | A1* | 8/2006 | Hosotani | ........... H02M 3/33576 318/136 |
| 2008/0265670 | A1 | 10/2008 | Pansier | |
| 2009/0251925 | A1 | 10/2009 | Usui et al. | |
| 2009/0316444 | A1* | 12/2009 | Yamaguchi | ......... H02M 3/3353 363/21.12 |
| 2010/0172157 | A1* | 7/2010 | Chen | ................ H02M 3/33592 363/21.02 |
| 2011/0090715 | A1* | 4/2011 | Hosotani | ............... H02M 1/126 363/17 |
| 2012/0313433 | A1* | 12/2012 | Uno | .................. H02M 3/33561 307/31 |
| 2013/0250622 | A1* | 9/2013 | Hosotani | ........... H02M 3/33553 363/16 |
| 2014/0146577 | A1* | 5/2014 | Uno | .................. H02M 3/33561 363/21.02 |

FOREIGN PATENT DOCUMENTS

| | | |
|---|---|---|
| JP | 06-078533 A | 3/1994 |
| JP | 2000-217356 A | 8/2000 |
| JP | 2001-078445 A | 3/2001 |
| JP | 2001-251852 A | 9/2001 |
| JP | 2004-194405 A | 7/2004 |
| JP | 2006-197755 A | 7/2006 |
| JP | 2008-507950 A | 3/2008 |
| JP | 2009-138917 A | 6/2009 |
| WO | 03/052913 A1 | 6/2003 |
| WO | 2005/076447 A1 | 8/2005 |
| WO | 2006/061924 A1 | 6/2006 |

* cited by examiner

SWITCHING POWER-SUPPLY CIRCUIT

BACKGROUND OF THE INVENTION

1. Field of the Invention

The present invention relates to a switching power-supply circuit that outputs a voltage from each of a plurality of output portions, and in particular, to a switching power-supply circuit including a circuit that stabilizes the output voltage of a second output portion, in addition to a feedback circuit that feedback-controls a primary side in accordance with the output voltage of a first output portion.

2. Description of the Related Art

In International Publication No. WO2006/061924, Japanese Unexamined Patent Application Publication No. 3-7062, and Japanese Unexamined Patent Application Publication No. 2000-217356, switching power-supply circuits are disclosed, each of which outputs a voltage from each of a plurality of output portions. In each of International Publication No. WO2006/061924, Japanese Unexamined Patent Application Publication No. 3-7062, and Japanese Unexamined Patent Application Publication No. 2000-217356, a configuration is used in which a rectified voltage or a rectified and smoothed voltage is input to output a second output (sub output) voltage separately from the first output (main output) of a converter and the second output voltage is adjusted by controlling a switching element on a second output side in accordance with this second output voltage.

In a switching power-supply circuit disclosed in International Publication No. WO2006/061924, a time period when electric power is supplied from the primary side of a transformer to the secondary side thereof is set based on a resonant frequency that is defined by a capacitor used for current resonance and the leakage inductance of the transformer (See, for example, Paragraph [0034] in International Publication No. WO2006/061924). In addition, in a second output line, an output control switching element and an output control circuit controlling the pulse widths of the turn-on and turn-off thereof are provided (See, for example, Paragraph [0028] in International Publication No. WO2006/061924).

FIG. 1A is the schematic view of the switching power-supply circuit illustrated in International Publication No. WO2006/061924, and FIG. 1B is the block diagram of the inside of the output control circuit. In the switching power-supply circuit, an output control MOS-FET 40 is connected between the cathode of a second output rectifier diode 15 and a second output smoothing capacitor 16 which are included in the second rectifying/smoothing circuit 17, and between second direct-current output terminals 18, 19 and the gate of the output control MOS-FET 40, an output control circuit 41 is provided to control the turn-on and turn-off of the output control MOS-FET 40 based on the voltage of the second output smoothing capacitor 16. The output control MOS-FET 40 is subjected to an on-off operation in synchronization with the on-period of a first main MOS-FET 1 and with a same switching frequency. In addition, a main control circuit 14 fixes the on-period of the first main MOS-FET 1, and controls the on-duty of the first main MOS-FET 1 by changing the on-period of a second main MOS-FET 2 based on the output voltage Vo1 of a first rectifying/smoothing circuit 9.

As illustrated in FIG. 1B, the output control circuit 41 includes a voltage fluctuation detection circuit 42 detecting a voltage Vt22 occurring in the second secondary winding 5c of a transformer 5 at the time of the turn-on of the first main MOS-FET 1, a second output voltage detection circuit 43 detecting the voltage Vo2 of the second output smoothing capacitor 16 and outputting an error signal Ve2 between the detected voltage and a reference voltage specifying a second output voltage value, a PWM control circuit 44 that is driven by the detection signal Vtd of the voltage fluctuation detection circuit 42 and outputs a pulse train signal Vpt having a duty ratio controlled based on the error signal Ve2 of the second output voltage detection circuit 43, an RS flip-flop 45 that is set by the detection signal Vtd of the voltage fluctuation detection circuit 42 and reset by the pulse train signal Vpt of the PWM control circuit 44, and a drive circuit 46 supplying an actuation signal Vs2 to the gate of the output control MOS-FET 40 in response to the output signal of the RS flip-flop 45.

With this configuration, the output control MOS-FET 40 is PWM-controlled in accordance with the second output voltage Vo2, and the second output voltage Vo2 is stabilized.

In a switching power-supply circuit disclosed in Japanese Unexamined Patent Application Publication No. 3-7062, a configuration is provided in which a first output voltage is controlled by a frequency modulator including a secondary-side control mechanism controlling the duty cycle of a pulse train and a second output voltage is controlled by thinning the number of pulse voltage waves.

In a switching power-supply circuit disclosed in Japanese Unexamined Patent Application Publication No. 2000-217356, a switch circuit is provided in the secondary winding output of a transformer in an output system other than an output system performing main feedback. Furthermore, an output voltage is detected, the ON-width of the secondary winding output of the transformer in the output system other than the output system performing the main feedback is controlled by causing a pulse width control circuit to generate a pulse signal and causing this pulse signal to be synchronized with the pulse control signal of the output system performing the main feedback, and the output voltage is stabilized.

In each of the switching power-supply circuits disclosed in International Publication No. WO2006/061924, Japanese Unexamined Patent Application Publication No. 3-7062, and Japanese Unexamined Patent Application Publication No. 2000-217356, a PWM control circuit is required that is used to generate a pulse train signal having a duty ratio based on the error signal of a second output voltage detection circuit, and the overall control circuit is complicated.

SUMMARY OF THE INVENTION

Preferred embodiments of the present invention provide a switching power-supply circuit in which the circuit configuration is simplified and the size and cost are reduced while maintaining a high degree of accuracy in the output voltage of a second output portion.

A switching power-supply device according to a preferred embodiment of the present invention includes a transformer including a primary winding, a first secondary winding, and a second secondary winding, a first switching element arranged to be connected in series to the primary winding, a first rectifying/smoothing circuit arranged to generate a first output voltage by rectifying and smoothing an output of the first secondary winding, a second rectifying/smoothing circuit arranged to generate a second output voltage by rectifying and smoothing an output of the second secondary winding, a first feedback circuit arranged to generate a feedback signal according to the first output voltage, and a switching control circuit arranged to control the first switching element based on the feedback signal and to stabilize the first output voltage. A rectifier circuit in the second rectifying/smoothing circuit includes a rectifier switch element, and a drive control circuit causing the rectifier switch element Qs to be conductively connected when an input voltage is greater than the second output voltage and the second output voltage is less than a predetermined voltage, and the rectifier circuit in the second rectifying/smoothing circuit stabilizes the second output voltage by controlling the number of pulses per unit time in a pulse current flowing through the rectifier circuit itself.

With this configuration, the following effect is achieved.

When an input voltage (namely, a second secondary winding voltage) to the second rectifying/smoothing circuit that rectifies and smoothes the output of the second secondary winding of the transformer is greater than the second output voltage and the second output voltage is less than the predetermined voltage, the rectifier switch element is conductively connected. Therefore, the number of pulses per unit time in the pulse current flowing through the rectifier switch element is controlled and a high degree of accuracy in the second output voltage is achieved.

Since the rectifier switch element operates in response to a voltage occurring in the transformer, the operation of the rectifier switch element is an operation that is synchronized with the switching of the first switching element. Therefore, a generation circuit and a transmission circuit, used for a synchronization signal, are not required, and it is possible to reduce the size of the switching power supply device. In addition, there is no interference due to the mixing of a plurality of switching frequencies, and it is possible to significantly reduce or prevent the occurrence of sound or noise.

Since the rectifier switch element operates in response to an increase or decrease in the current of a load to which the second output voltage is applied, it is possible to rapidly respond to a load change.

The rectifier switch element is turned on before a timing when a voltage is applied to both ends, and thus, the rectifier switch element is set in a ZVS (zero-voltage switch) operation. Therefore, a switching loss, a noise, and a surge voltage at the time of turn-on do not significantly occur. As a result, the amount of heat generation is reduced, and the size and weight of the power-supply device is reduced. In addition, instability of a switching operation due to the influence of a noise does not occur, and the degree of accuracy in an output voltage is maintained.

In the switching power-supply circuit according to another preferred embodiment of the present invention, the rectifier circuit in the second rectifying/smoothing circuit preferably includes a second rectifying element that is connected in series to the rectifier switch element and causes a voltage of the second secondary winding to flow in a forward direction. With this configuration, since the rectifier switch element is turned off after the second rectifying element has been non-conductively connected, the ZCS (zero-current switch) operation functions. Therefore, a switching loss, a noise, and a surge voltage at the time of turn-off do not significantly occur. As a result, a high-voltage resistance characteristic is not required for the rectifier switch element a conduction loss is small, the amount of heat generation is reduced, and the size and weight of the power-supply device is reduced. In addition, instability of a switching operation due to the influence of a noise does not occur, and the degree of accuracy in an output voltage is maintained.

In the switching power-supply circuit according to another preferred embodiment of the present invention, the second rectifying/smoothing circuit preferably includes a secondary-side inductor that delays a rise of a current flowing into the rectifier circuit in the second rectifying/smoothing circuit. Accordingly, since, at the time of the turn-on of the rectifier switch element, the rise of a current flowing in the rectifier circuit in the second rectifying/smoothing circuit is delayed by the secondary-side inductor and it is possible to reliably cause the rectifier switch element to be conductively connected before a current starts flowing in the rectifier circuit in the second rectifying/smoothing circuit. Therefore, a ZVS (zero-voltage switch) operation functions, and a switching loss does not occur or hardly occurs at the time of turn-on.

In the switching power-supply circuit according to another preferred embodiment of the present invention, for example, at the time of the conductive connection of the rectifier circuit in the second rectifying/smoothing circuit, the drive control circuit causes the rectifier switch element to be conductively connected, using a winding voltage occurring in a winding of the transformer. With this configuration, a drive and control direct-current power supply used to drive the rectifier switch element is not required, and it is possible to reduce the size and weight of the switching power-supply circuit. In addition, since a fixed loss due to the direct-current power supply does not occur, a high-efficiency operation is achieved.

In the switching power-supply circuit according to another preferred embodiment of the present invention, for example, when a current of a load to which the second output voltage is applied is relatively small (a light load), the rectifier circuit in the second rectifying/smoothing circuit operates so as to restrict a conduction time-period of a forward current. With this configuration, the conduction time-period of the forward current is restricted by the rectifier switch, the voltage rise of the output voltage Vo2 is significantly reduced or prevented, and a ripple voltage is reduced.

The switching power-supply circuit according to another preferred embodiment of the present invention preferably includes a second switching element arranged to be connected to a position defining a closed loop in combination with the primary winding, and the switching control circuit alternately turns on and turns off the first switching element and the second switching element with a short dead time provided therebetween. With this configuration, it is possible for the first switching element and the second switching element to perform a ZVS (zero-voltage switching) operation, and it is possible to achieve a high efficiency by reducing a switching loss. In addition, when a current waveform flowing in the rectifier switch element is in a resonant waveform whose shape is a sinusoidal half-wave, it is possible to relax the restriction on the timings of the turn-on and turn-off of the rectifier switch element, and it is possible to simplify the configuration of the drive control circuit for the rectifier switch element.

According to various preferred embodiments of the present invention, a small-sized and low-cost switching power-supply circuit is provided which includes a simplified circuit configuration while maintaining a high degree of accuracy in the output voltage of a second output portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1A:
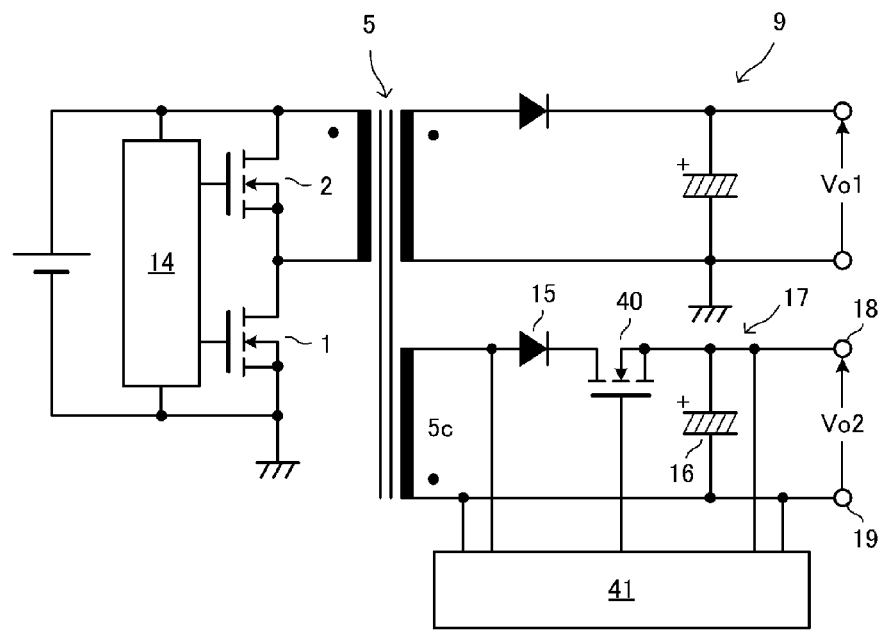
FIG. 1A is a schematic view of a switching power-supply circuit illustrated in International Publication No. WO2006/061924.
Figure 1B:
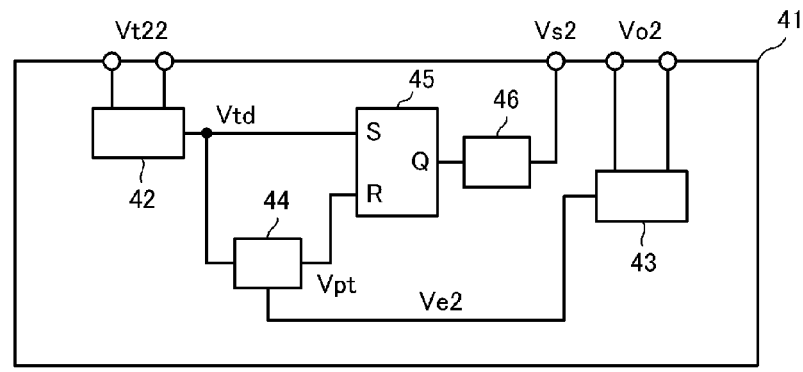
FIG. 1B is a block diagram of the inside of an output control circuit.
Figure 2A:
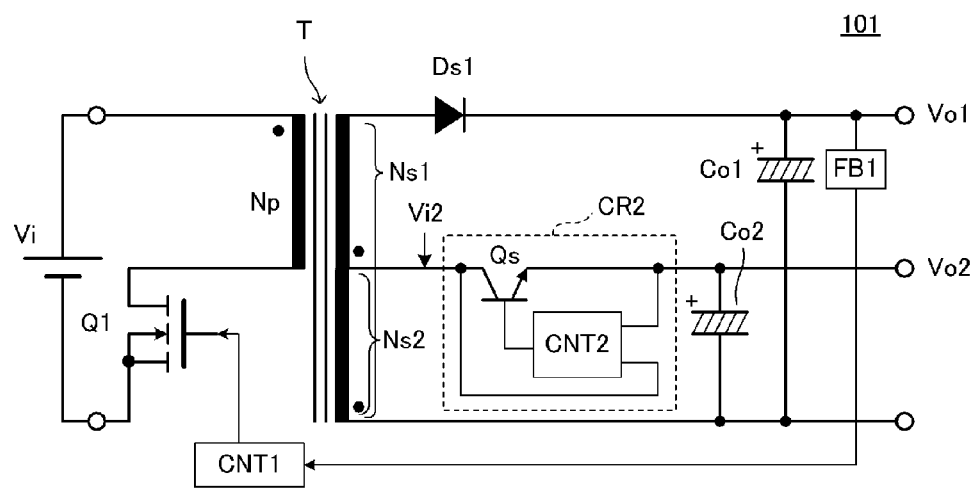
FIG. 2A is a circuit diagram of a switching power-supply circuit according to a first preferred embodiment of the present invention.
Figure 2B:
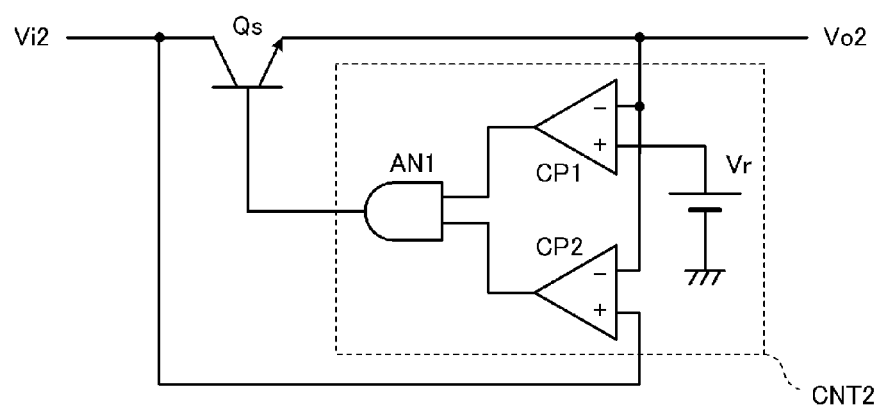
FIG. 2B is a circuit diagram of a rectifier circuit in a second rectifying/smoothing circuit within the switching power-supply circuit.

FIG. 2A is the circuit diagram of a switching power-supply circuit 101 according to a first preferred embodiment of the present invention. FIG. 2B is the circuit diagram of a rectifier circuit CR2 (hereinafter, referred to as a "second rectifier circuit") in a second rectifying/smoothing circuit within the switching power-supply circuit 101.

The switching power-supply circuit 101 includes a transformer T including a primary winding Np, a first secondary winding Ns1, and a second secondary winding Ns2, a first switching element Q1 connected in series to the primary winding Np, a first rectifying/smoothing circuit generating a first output voltage Vo1 by rectifying and smoothing the output of the first secondary winding Ns1, a second rectifying/smoothing circuit generating a second output voltage Vo2 by rectifying and smoothing the output of the second secondary winding Ns2, a first feedback circuit FB1 generating a feedback signal according to the first output voltage Vo1, and a first switching control circuit CNT1 controlling the first switching element Q1 based on this feedback signal and stabilizing the first output voltage Vo1.

The above-described first rectifying/smoothing circuit includes a first rectifying element Ds1 and a capacitor Co1, connected to the first secondary winding Ns1. In addition, the second rectifier circuit CR2 includes a rectifier switch element Qs and a second switching control circuit CNT2, connected to the second secondary winding Ns2, and the above-described second rectifying/smoothing circuit includes the second rectifier circuit CR2 and a capacitor Co2. The second switching control circuit CNT2 controls the rectifier switch element Qs.

As illustrated in FIG. 2B, the second switching control circuit CNT2 includes two comparators CP1 and CP2, a reference-voltage circuit Vr, and an AND gate AN1. When the second output voltage Vo2 is less than the voltage of the reference-voltage circuit Vr, the comparator CP1 outputs an H level. When the voltage Vi2 of the second secondary winding Ns2 is greater than the second output voltage Vo2, the comparator CP2 outputs an H level. When both of the outputs of the comparators CP1 and CP2 are the H levels, the AND gate AN1 outputs an H level, and turns on the rectifier switch element Qs.

According to the first preferred embodiment, such PWM control circuits as illustrated in International Publication No. WO2006/061924 are not required, and it is possible to simplify a control circuit used to output a second output voltage.

In addition, when the first switching element Q1 has been turned off, a voltage having a reverse polarity occurs in the second secondary winding Ns2. When the rectifier switch element Qs is turned on during the off-period of the first switching element Q1, a pulse current flows without being restricted. When the rectifier switch element Qs is turned off, the pulse current does not flow. In other words, by controlling the turn-on and turn-off of the rectifier switch element Qs, it is possible to control the number of pulses in the pulse current and stabilize the second output voltage Vo2.

Second Preferred Embodiment

Figure 3A:
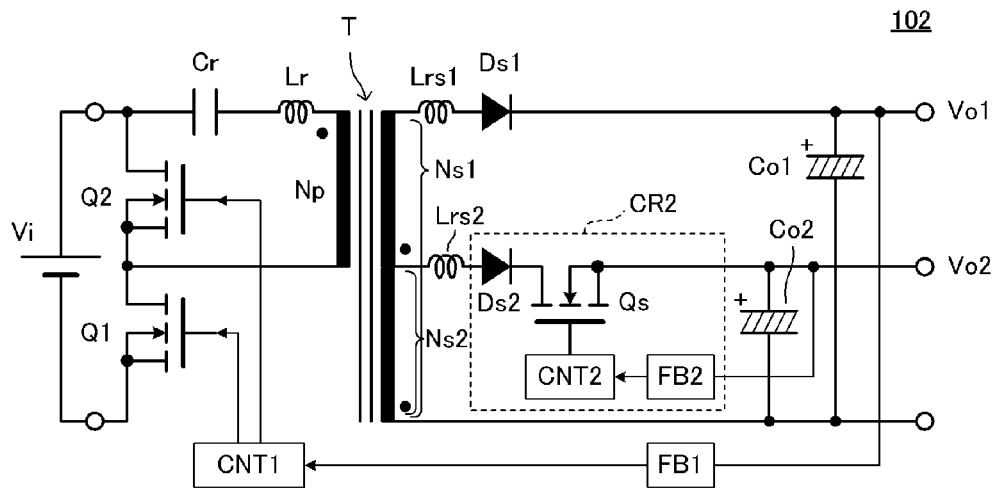
FIG. 3A is a circuit diagram of a switching power-supply circuit according to a second preferred embodiment of the present invention.
Figure 3B:
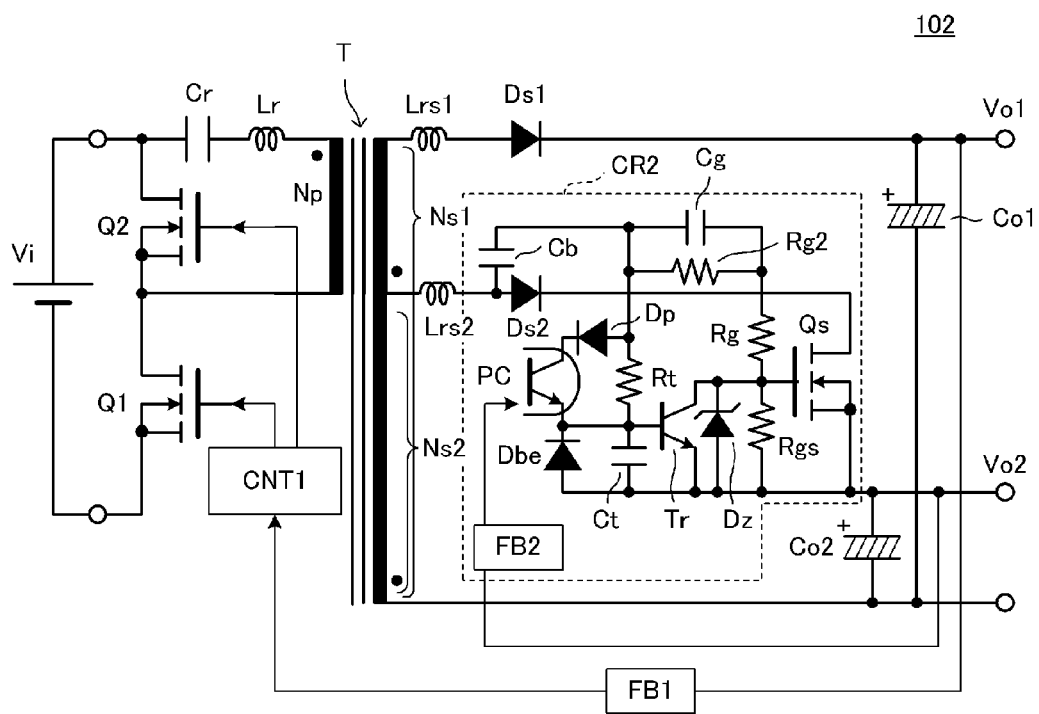
FIG. 3B is a diagram illustrating a specific circuit configuration of a rectifier circuit in a second rectifying/smoothing circuit.
Figure 4:
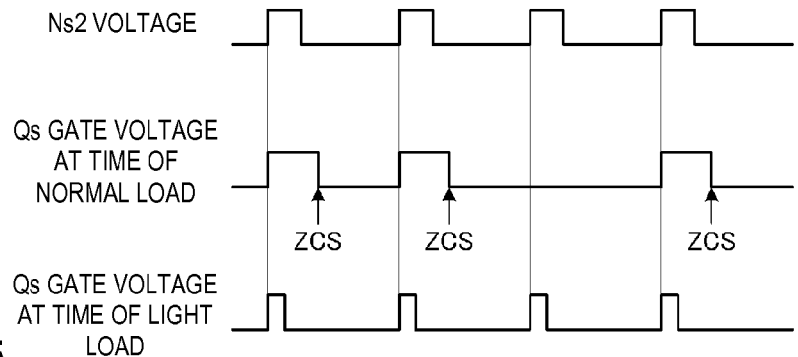
FIG. 4 is a main waveform diagram illustrating an operation of the switching power-supply circuit.

FIGS. 3A and 3B are the circuit diagrams of a switching power-supply circuit 102 according to a second preferred embodiment of the present invention. FIG. 4 is a main waveform diagram illustrating the operation of the switching power-supply circuit 102.

The switching power-supply circuit 102 includes a transformer T including a primary winding Np, a first secondary winding Ns1, and a second secondary winding Ns2, a first switching element Q1 connected in series to the primary winding Np, a second switching element Q2 connected to a position defining a closed loop in combination with the primary winding Np, a first switching control circuit CNT1 alternately turning on and turning off the first switching element Q1 and the second switching element Q2 with a short dead time provided therebetween, and a first feedback circuit FB1. On the primary side of the transformer T, a resonance inductor Lr and a resonance capacitor Cr are provided in series with the primary winding Np. A resonant circuit is defined by the resonance inductor Lr and the resonance capacitor Cr.

In addition, the switching power-supply circuit 102 includes a first rectifying/smoothing circuit generating a first output voltage Vo1 by rectifying and smoothing the output of the first secondary winding Ns1 and a second rectifying/smoothing circuit generating a second output voltage Vo2 by rectifying and smoothing the output of the second secondary winding Ns2. The first rectifying/smoothing circuit includes a first rectifying element Dsl and a capacitor Co1, connected to the first secondary winding Ns1. In addition, the second rectifying/smoothing circuit includes a second rectifier circuit CR2 and a capacitor Co2, connected to the second secondary winding Ns2. The second rectifier circuit CR2 includes a rectifier switch element Qs, a second switching control circuit CNT2 controlling this rectifier switch element Qs, and a feedback circuit FB2. In addition, the above-mentioned second rectifier circuit CR2 includes a second rectifying element Ds2, which is connected in series to the rectifier switch element Qs and causes the voltage of the second secondary winding Ns2 to flow in a forward direction.

In the second rectifying/smoothing circuit, a secondary-side inductor Lrs2 is provided that delays the rise of a current flowing into the second rectifier circuit CR2. This secondary-side inductor Lrs2 is the leakage inductance of the transformer T or an inductor connected to the second secondary winding Ns2 of the transformer T. The first rectifying/smoothing circuit includes an inductor Lrs1. This inductor Lrs1 is the leakage inductance of the transformer T.

The function of the switching power-supply circuit 102 illustrated in FIG. (A is as follows.

The first switching element Q1 and the second switching element Q2 are alternately turned on and turned off with a short dead time provided therebetween, provided by the control of the first switching control circuit CNT1. A switching frequency at this time is equal to or substantially equal to a resonant frequency set by the resonance inductor Lr and the resonance capacitor Cr.

When the first switching element Q1 has been turned off, a voltage having a reverse polarity occurs in the first secondary winding Ns1. In the first secondary winding Ns1, a current moderately rises due to the inductor Lrs1, and the first output voltage Vo1 is supplied.

The first feedback circuit FB1 negatively feeds back, to the first switching control circuit CNT1, a signal generated by comparing the first output voltage Vo1 with a reference voltage. With this control, the first output voltage Vo1 is maintained at a predetermined voltage, regardless of a load current flowing in a load to which the first output voltage Vo1 is applied or the voltage fluctuation of an input power supply Vi.

On the other hand, when the first switching element Q1 has been turned off, a voltage having a reverse polarity also occurs in the second secondary winding Ns2. In the second secondary winding Ns2, a current moderately rises due to the inductor Lrs2 and is rectified by the second rectifier circuit CR2 and smoothed by the capacitor Co2, and the second output voltage Vo2 is supplied. In this manner, during the off-period of the first switching element Q1, a pulse current flows in the rectifier switch element Qs.

The second feedback circuit FB2 negatively feeds back, to the second switching control circuit CNT2, a signal generated by comparing the second output voltage Vo2 with a reference voltage. Operations provided by the second feedback circuit FB2 and the second switching control circuit CNT2 are as follows.

When the output voltage Vo2 is less than the reference voltage, the rectifier switch element Qs is in a conduction state, the second rectifier circuit CR2 is conductively connected, a current moderately rises due to the inductor Lrs2, and the output voltage Vo2 is supplied. Since the rectifier switch element Qs is in the conduction state, the pulse current flowing in the rectifier switch element Qs during the off-period of the first switching element Q1 is not restricted. When the output voltage Vo2 is greater than the reference voltage, the rectifier switch element Qs is in a non-conduction state, the second rectifier circuit CR2 is non-conductively connected, and a pulse current does not flow in the rectifier switch element Qs during the off-period of the first switching element Q1. In this manner, the conductive connection/non-conductive connection of the rectifier switch element Qs are controlled based on the voltage information of the second output voltage Vo2.

In addition, the rise of the current flowing in the second rectifier circuit CR2 is delayed by an inductor, and the rectifier switch element Qs has been reliably conductively connected before a current starts flowing in the second rectifying element.

In addition, when a current flowing in the second rectifying element Ds2 is a backward current, the rectifier switch element Qs is non-conductively connected after the current has been cut off by the second rectifying element Ds2 having become inversely biased.

Furthermore, since the rectifier switch element Qs operates in response to a voltage occurring in the transformer T, the rectifier switch element Qs operates in synchronization with the switching frequencies of the first switching element Q1 and the second switching element Q2.

FIG. 3B is a diagram illustrating the specific circuit configuration of the second rectifier circuit CR2 illustrated in FIG. 3A.

In FIG. 3B, in the output portion of the second feedback circuit FB2 within the second rectifier circuit CR2, a light-emitting element is provided that is paired with the light-receiving element PC of a photo coupler. A circuit other than the second feedback circuit FB2, the second rectifying element Ds2, and the rectifier switch element Qs within this second rectifier circuit CR2 is the second switching control circuit CNT2 within FIG. 3A.

The operation of the switching power-supply circuit 102 is as follows.

(1) On-Period of First Switching Element Q1]

Due to the occurrence of the second output voltage Vo2, a capacitor Cb is charged through a zener diode Dz, a resistor Rg, and a parallel circuit including a resistor Rg2 and a capacitor Cg.

(2-1) On-Period of Second Switching Element Q2 (when Second Output Voltage Vo2 is Lower than Predetermined Voltage and Second Rectifier Circuit CR2 is in Conduction State)

When the first switching element Q1 has been turned off, the voltage of the second secondary winding Ns2 is inverted and the second switching element Q2 is turned on. The voltage of the capacitor Cb is applied between the gate and source of the rectifier switch element Qs through the parallel circuit including the resistor Rg2 and the capacitor Cg and the resistor Rg, and the rectifier switch element Qs is turned on. A current moderately rises with a delay from a voltage provided by the inductor Lrs2, the second rectifier circuit CR2 is put into a conduction state, and the second output voltage Vo2 is supplied while the capacitor Co2 is charged. In this manner, during the off-period of the first switching element Q1, a pulse current flows in the rectifier switch element Qs without being restricted.

When the second switching element Q2 has been turned off, the voltage of the second secondary winding Ns2 is inverted, the second rectifying element Ds2 becomes non-conductively connected, and the second rectifier circuit CR2 is put into a non-conduction state. After that, the first switching element Q1 is turned on. At this time, the transistor Tr has not been turned on before the second rectifier circuit CR2 is put into the non-conduction state.

(2-2) On-Period of Second Switching Element Q2 (when Second Output Voltage Vo2 is Higher than Predetermined Voltage and Second Rectifier Circuit CR2 is in Non-Conduction State)

When the second output voltage Vo2 is greater than the predetermined voltage, the impedance of the light-receiving element PC becomes small.

When the first switching element Q1 has been turned off, the voltage of the second secondary winding Ns2 is inverted, and the second switching element Q2 is turned on.

Due to the voltage of the capacitor Cb, the capacitor Ct is charged through a diode Dp, the light-receiving element PC, and a resistor Rt, and when a voltage between the base and emitter of the transistor Tr exceeds a threshold voltage, for example, about 0.6 V, the transistor Tr is turned on, no voltage is applied between the gate and source of the rectifier switch element Qs, the rectifier switch element Qs is turned off, and the second rectifier circuit CR2 maintains the non-conduction state. Therefore, during the off-period of the first switching element Q1, no pulse current flows in the rectifier switch element Qs. After that, the first switching element Q1 is turned on. A diode Dbe prevents the capacitor Ct from being subjected to inverse-voltage charge.

When the current of a load to which the second output voltage Vo2 is applied is a normal load current, a state in which the rectifier switch element Qs is turned on and a state (missing-tooth state) in which the rectifier switch element Qs is not turned on occur at the rises of the voltage of the second secondary winding Ns2 as illustrated in FIG. 4, and the second output voltage Vo2 is stabilized by controlling the number of pulses in the pulse current based on the occurrence frequency of the missing-tooth state.

When the current of a load to which the second output voltage Vo2 is applied is relatively small (a light load), a charging time constant with respect to the capacitor Ct becomes small, and after the rectifier switch element Qs has been turned on, the voltage of the capacitor Ct swiftly reaches about 0.6 V, for example, the transistor Tr is turned on, and the rectifier switch element Qs is turned off. In other words, in the light load, the on-time of the switch element Qs is reduced. Therefore, as illustrated in FIG. 4, during a time period when the voltage of the secondary winding Ns2 occurs, the switch element Qs is turned off.

In this manner, in a normal load, a waveform at the time of the normal load in FIG. 4 is obtained, and in the light load, a waveform at the time of the light load in FIG. 4 or a waveform where the waveform at the time of the normal load and the waveform at the time of the light load in FIG. 4 are mixed is obtained.

In addition, a case occurs in which when the switch element Qs has been turned off within a time period during which the voltage of the secondary winding Ns2 has occurred, a ZCS operation (zero-current switch) does not function. However, since a load is the light load and a current value cut off by the rectifier switch element Qs is small, a switching loss and a noise at the time of turn-off do not cause any problems.

According to the second preferred embodiment of the present invention, the following effects are achieved.

(a) When the voltage of the second secondary winding Ns2 of the transformer T is greater than the second output voltage Vo2 and the second output voltage Vo2 is less than the predetermined voltage, the rectifier switch element Qs is conductively connected. Therefore, the number of pulses per unit time in a pulse current flowing through the rectifier switch element Qs is controlled and a high degree of accuracy in the second output voltage Vo2 is achieved.

(b) Since, at the time of the turn-on of the rectifier switch element Qs, the rise of a current flowing in the second rectifier circuit CR2 is delayed by the inductor Lrs2 and it is possible to reliably cause the rectifier switch element Qs to be conductively connected before a current starts flowing in the second rectifier circuit CR2, a ZVS (zero-voltage switch) operation functions. In addition, since the rectifier switch element Qs is turned off after the second rectifying element Ds2 has been non-conductively connected, the ZCS (zero-current switch) operation functions. Therefore, a switching loss, a noise, and a surge voltage at the time of turn-on and at the time of turn-off do not occur. As a result, a high-voltage resistance characteristic is not required for the rectifier switch element Qs, and an element whose conduction loss is small (whose voltage resistance is low). Therefore, the amount of heat generation is reduced, and the size and weight of a power-supply device is reduced. In addition, instability of a switching operation due to the influence of a noise is prevented, and the degree of accuracy in an output voltage is maintained.

(c) Since the rectifier switch element Qs operates in response to a voltage occurring in the transformer, the operation of the rectifier switch element Qs is an operation that is synchronized with the switching of the first switching element. Therefore, a generation circuit and a transmission circuit, used for a synchronization signal, are not required, and downsizing is achieved. In addition, there is no interference due to the mixing of a plurality of switching frequencies, and it is possible to prevent the occurrence of sound or noise.

(d) Since the rectifier switch element Qs operates in response to an increase or decrease in the current of a load to which the second output voltage Vo2 is applied, it is possible to rapidly respond to a load change.

(e) Since the rectifier switch element Qs operates in response to an alternating-current voltage occurring in the second secondary winding Ns2 of the transformer T, a direct-current power supply used to drive and control is required, and thus, it is possible to reduce the size and weight of the switching power-supply device. In addition, since a fixed loss due to the installation of the direct-current power supply does not occur, a high-efficiency operation is enabled.

Third Preferred Embodiment

Figure 5:
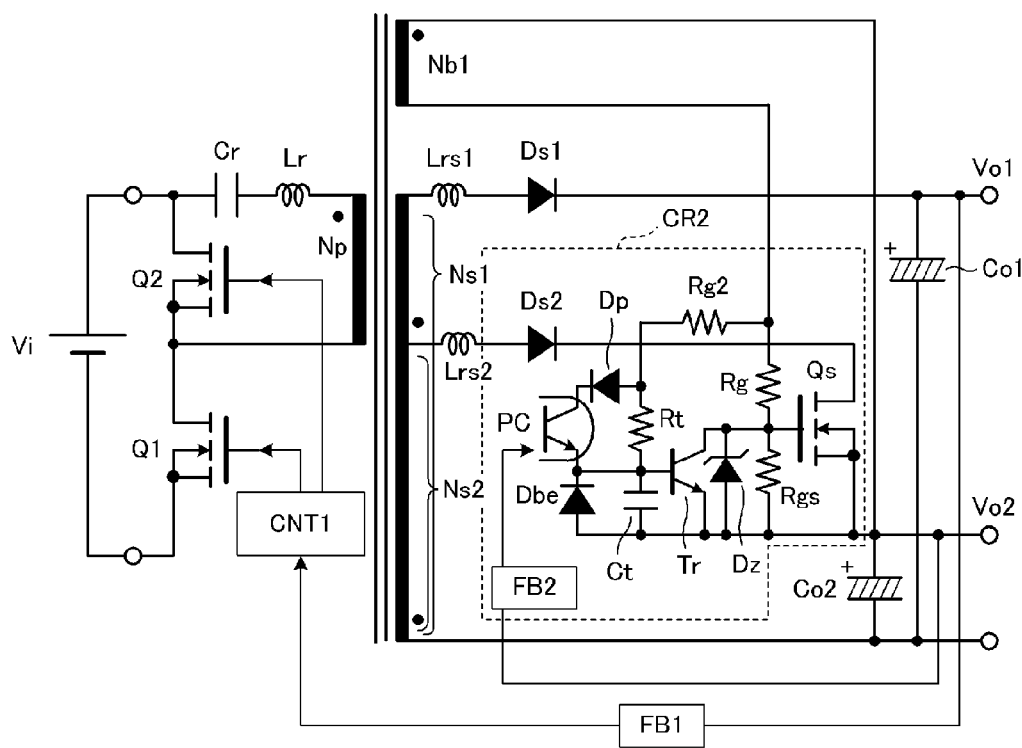
FIG. 5 is a circuit diagram of a switching power-supply circuit according to a third preferred embodiment of the present invention.

FIG. 5 is the circuit diagram of a switching power-supply circuit 103 according to a third preferred embodiment of the present invention. This switching power-supply circuit 103 is an example in which a rectifier switch element Qs is driven and controlled using a voltage occurring in a drive winding Nb1 provided in a transformer T. In addition, this switching power-supply circuit 103 is an example in which a second output voltage Vo2 is less than a first output voltage Vo1.

The operation of the switching power-supply circuit 103 is as follows.

(1) On-Period of Second Switching Element Q2 (when Second Output Voltage Vo2 is Lower than Predetermined Voltage and Second Rectifier Circuit CR2 is in Conduction State)

When a first switching element Q1 has been turned off, the voltage of the drive winding Nb1 passes through a resistor Rg, a voltage is applied between the gate and source of the rectifier switch element Qs, and the rectifier switch element Qs is turned on. A current moderately rises with a delay from a voltage provided by an inductor Lrs2, a second rectifier circuit CR2 is put into a conduction state, and the second output voltage Vo2 is supplied while a capacitor Co2 is charged.

When a second switching element Q2 has been turned off, the voltage of a second secondary winding Ns2 is inverted, a second rectifying element Ds2 becomes non-conductively connected, and the second rectifier circuit CR2 is put into a non-conduction state. After that, the first switching element Q1 is turned on.

(2) On-Period of Second Switching Element Q2 (when Second Output Voltage Vo2 is Higher than Predetermined Voltage and Second Rectifier Circuit CR2 is in Non-Conduction State)

When the second output voltage Vo2 is greater than a predetermined voltage, the impedance of a light-receiving element PC is relatively small. The voltage of the drive winding Nb1 charges a capacitor Ct through a resistor Rg2 and the light-receiving element PC. When the voltage of the capacitor Ct has exceeded a threshold voltage, for example, about 0.6 V, between the base and emitter of a transistor Tr, the transistor Tr is turned on. When the transistor Tr has been turned on, no voltage is applied between the gate and source of the rectifier switch element Qs, the rectifier switch element Qs is turned off, and the second rectifier circuit CR2 maintains the non-conduction state. After that, the first switching element Q1 is turned on.

The other functions are preferably the same or substantially the same as the second preferred embodiment.

According to the third preferred embodiment, since it is possible to directly turn on the rectifier switch element Qs in response to the voltage of the drive winding Nb1, the capacitor Cb illustrated in FIG. 3B is not required. In addition, since, based on the number of turns of the drive winding Nb1 provided in the transformer T, it is possible to set a voltage suitable to drive and control the rectifier switch element Qs, it is possible to drive the rectifier switch element Qs with optimum timing, and thus, it is possible to further reduce a loss.

Further, the same or substantially the same advantages as described in the first and second preferred embodiments are achieved.

Fourth Preferred Embodiment

Figure 6:
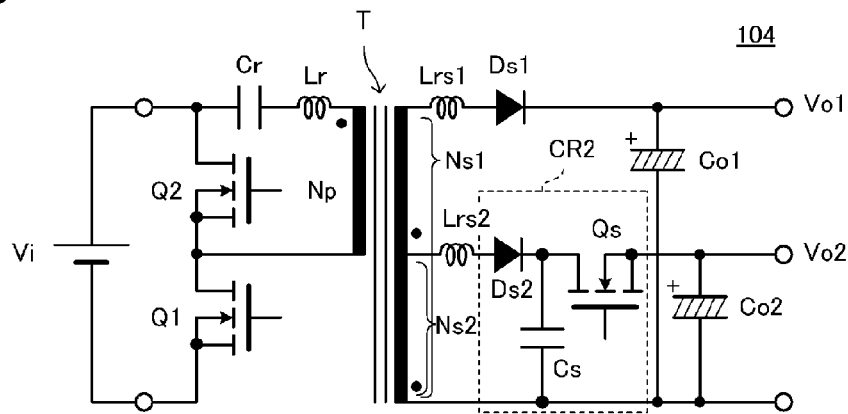
FIG. 6 is a circuit diagram of a switching power-supply circuit according to a fourth preferred embodiment of the present invention.

FIG. 6 is the circuit diagram of a switching power-supply circuit 104 according to a fourth preferred embodiment of the present invention. In the switching power-supply circuit 104, a second rectifier circuit CR2 includes a capacitor Cs arranged to absorb a surge voltage that is connected in parallel to a second rectifying element Ds2. The remaining configuration is preferably the same or substantially the same as that illustrated in the second preferred embodiment.

According to the fourth preferred embodiment, in a transient change such as when the voltage of an input power supply Vi or a second output voltage Vo2 has suddenly changed, it is possible to significantly reduce or prevent a surge voltage occurring between both ends of a rectifier switch element Qs when a current flowing in an inductor Lrs2 has been steeply cut off by the rectifier switch element Qs, and it is possible to significantly reduce or prevent the occurrence of an excessive voltage stress.

Further, the same or substantially the same advantages as those described in the first and second preferred embodiments are achieved.

Fifth Preferred Embodiment

Figure 7:
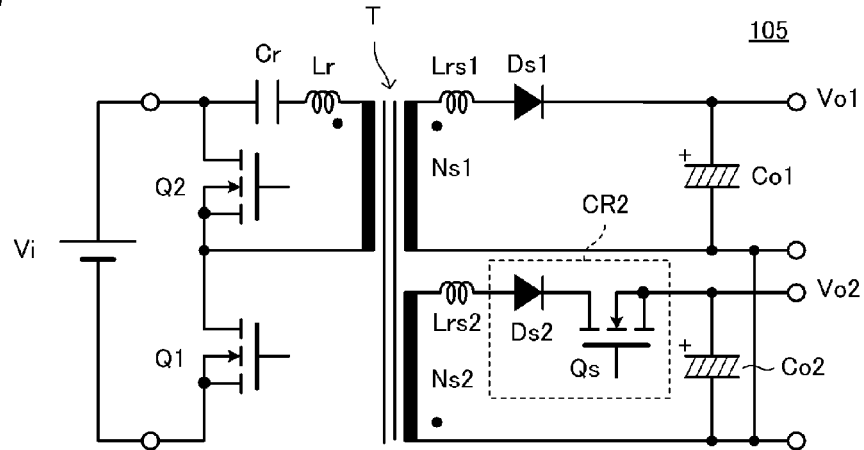
FIG. 7 is a circuit diagram of a switching power-supply circuit according to a fifth preferred embodiment of the present invention.

FIG. 7 is the circuit diagram of a switching power-supply circuit 105 according to a fifth preferred embodiment of the present invention. The switching power-supply circuit 105 is an example in which a first secondary winding Ns1 and a second secondary winding Ns2 are configured as separate windings. In addition, the switching power-supply circuit 105 is an example in which the first secondary winding Ns1 and the second secondary winding Ns2 are configured as windings having reverse polarities. The remaining configuration is preferably the same or substantially the same as that illustrated in the second preferred embodiment.

According to the fifth preferred embodiment, a first output voltage Vo1 is obtained from the first secondary winding Ns1 during the on-period of a first switching element Q1, and a output voltage Vo2 is obtained from the second secondary winding Ns2 at the time of the conductive connection of a second rectifier circuit CR2, during the time period of the turn-on of a second switching element Q2. It is possible to control the voltage of the second output voltage Vo2 with a high degree of accuracy, using the second rectifier circuit CR2. In addition, since energy is transmitted from a primary side to a secondary side during the on-period of any one of the first switching element Q1 and the second switching element Q2, it is possible to reduce the size of a transformer.

Further, the same or substantially the same advantages as those described in the first and second preferred embodiments are achieved.

Sixth Preferred Embodiment

Figure 8:
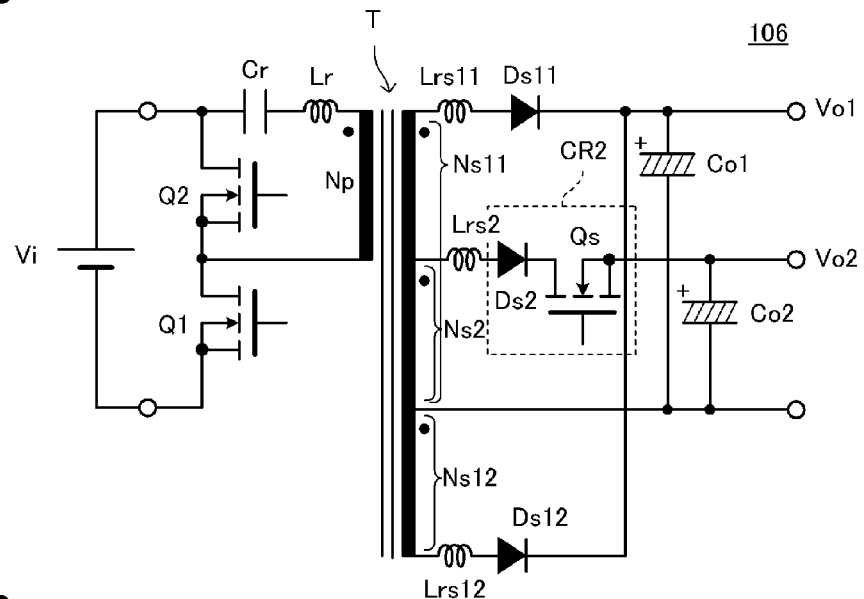
FIG. 8 is a circuit diagram of a switching power-supply circuit according to a sixth preferred embodiment of the present invention.

FIG. 8 is the circuit diagram of a switching power-supply circuit 106 according to a sixth preferred embodiment of the present invention. The switching power-supply circuit 106 includes two first secondary windings Ns11 and Ns12 in a transformer T, and in the output thereof, a center-tap rectifier circuit including diodes Ds11 and Ds12 and a capacitor Co1 is provided. The remaining configuration is preferably the same or substantially the same as that illustrated in the second preferred embodiment.

In this manner, the center-tap rectifier circuit is provided in the first secondary windings, and thus, it is possible to transmit energy from a primary side to a secondary side during the on-period of each of a first switching element Q1 and a second switching element Q2. Therefore, it is possible to reduce the size of a transformer.

Further, the same or substantially the same advantages as those described in the first and second preferred embodiments are achieved.

Seventh Preferred Embodiment

Figure 9:
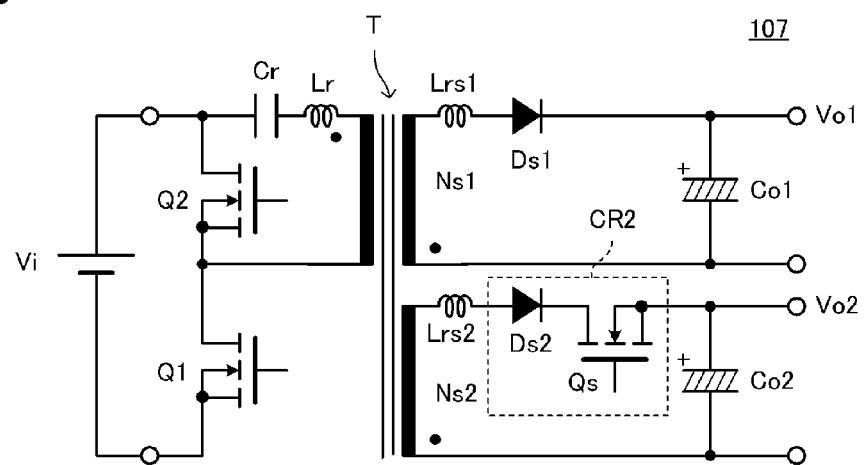
FIG. 9 is a circuit diagram of a switching power-supply circuit according to a seventh preferred embodiment of the present invention.

FIG. 9 is the circuit diagram of a switching power-supply circuit 107 according to a seventh preferred embodiment of the present invention. The switching power-supply circuit 107 is an example in which a first secondary winding Ns1 and a second secondary winding Ns2 are configured as separately insulated windings. In addition, the switching power-supply circuit 107 is an example in which the first secondary winding Ns1 and the second secondary winding Ns2 are configured as windings having a same polarity. The remaining configuration is preferably the same or substantially the same as that illustrated in the second preferred embodiment.

According to the seventh preferred embodiment, it is possible to obtain a first output voltage Vo1 and a second output voltage Vo2 as outputs that are insulated from each other.

Further, the same or substantially the same advantages as those described in the first and second preferred embodiments are achieved.

Eighth Preferred Embodiment

Figure 10:
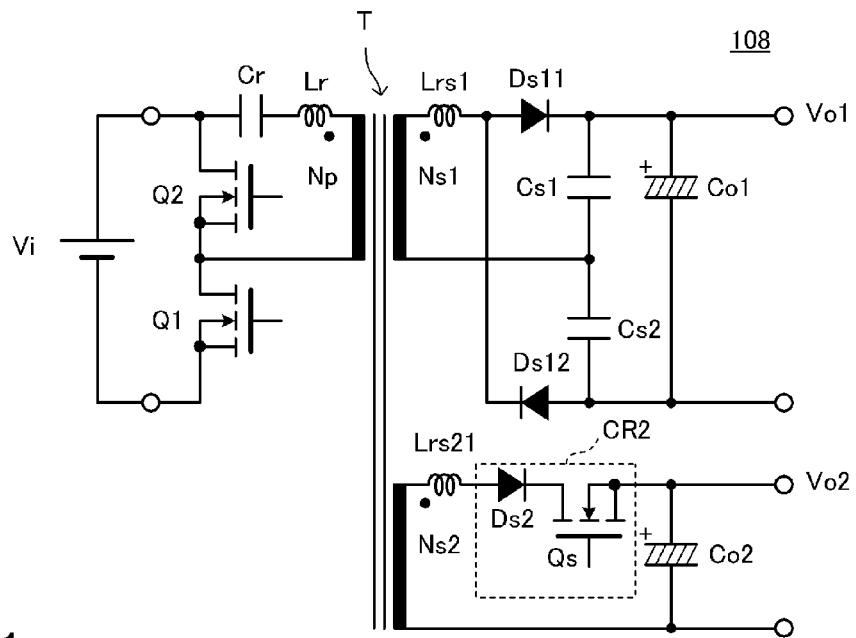
FIG. 10 is a circuit diagram of a switching power-supply circuit according to an eighth preferred embodiment of the present invention.

FIG. 10 is the circuit diagram of a switching power-supply circuit 108 according to an eighth preferred embodiment of the present invention. The switching power-supply circuit 108 is an example of a configuration in which a voltage doubler rectifier circuit including diodes Ds11 and Ds12 and capacitors Cs1 and Cs2 is connected to a first secondary winding Ns1 and the voltage of a second secondary winding Ns2 is controlled by a second rectifier circuit CR2. The remaining configuration is preferably the same or substantially the same as that illustrated in the second preferred embodiment.

According to the eighth preferred embodiment, since energy is transmitted from a primary side to a secondary side during the on-period of each of a first switching element Q1 and a second switching element Q2, it is possible to reduce the size of a transformer. In addition, it is possible to configure the first secondary winding Ns1 used to obtain a first output voltage Vo1 using a single secondary winding.

Further, the same or substantially the same advantages as those described in the first and second preferred embodiments are achieved.

Ninth Preferred Embodiment

Figure 11:
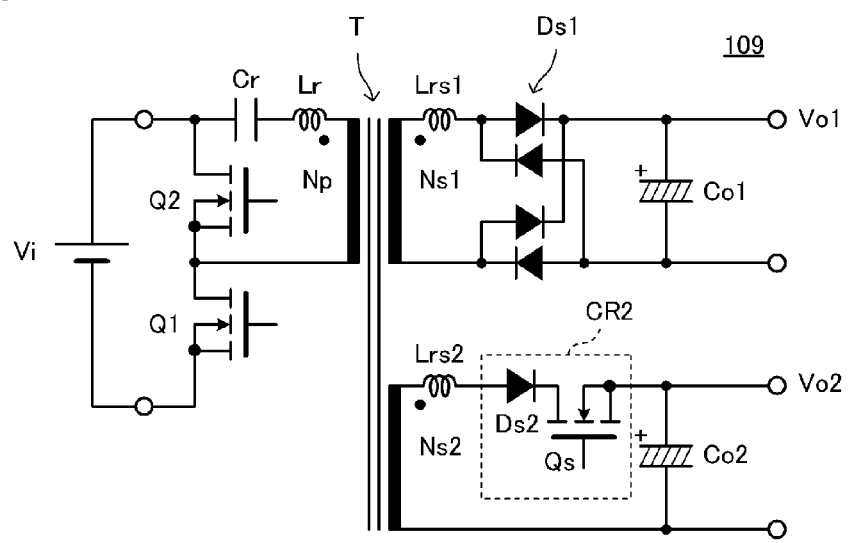
FIG. 11 is a circuit diagram of a switching power-supply circuit according to a ninth preferred embodiment of the present invention.

FIG. 11 is the circuit diagram of a switching power-supply circuit 109 according to a ninth preferred embodiment of the present invention. The switching power-supply circuit 109 is an example of a configuration in which a full-wave rectifier circuit including four diodes Ds1 is connected to a first secondary winding Ns1 and the voltage of a second secondary winding Ns2 is controlled by a second rectifier circuit CR2. The remaining configuration is preferably the same or substantially the same as that illustrated in the second preferred embodiment.

According to the ninth preferred embodiment, since energy is transmitted from a primary side to a secondary side during the on-period of each of a first switching element Q1 and a second switching element Q2, it is possible to reduce the size of a transformer. In addition, it is possible to configure the first secondary winding Ns1 used to obtain a first output voltage Vo1 using a single secondary winding.

Further, the same or substantially the same advantages as those described in the first and second preferred embodiments are achieved.

Tenth Preferred Embodiment

Figure 12:
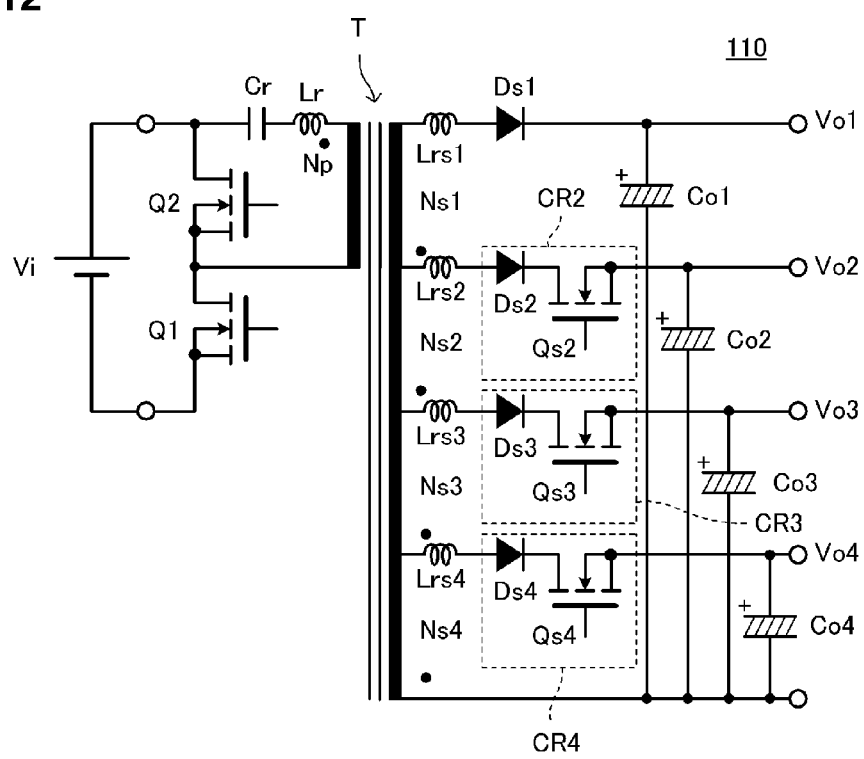
FIG. 12 is a circuit diagram of a switching power-supply circuit according to a tenth preferred embodiment of the present invention.

FIG. 12 is the circuit diagram of a switching power-supply circuit 110 according to a tenth preferred embodiment of the present invention. The switching power-supply circuit 110 is an example of a configuration including a plurality of secondary-side rectifier circuits CR2, CR3, and CR4. The remaining configuration is preferably the same or substantially the same as that illustrated in the second preferred embodiment.

According to the tenth preferred embodiment, since the plurality of rectifier circuits CR2, CR3, and CR4 are included and individually controlled, it is possible to control each of a plurality of second output voltages Vo2, Vo3, and Vo4 with a high degree of accuracy.

Further, the same or substantially the same advantages as those described in the first and second preferred embodiments are achieved.

Eleventh Preferred Embodiment

Figure 13:
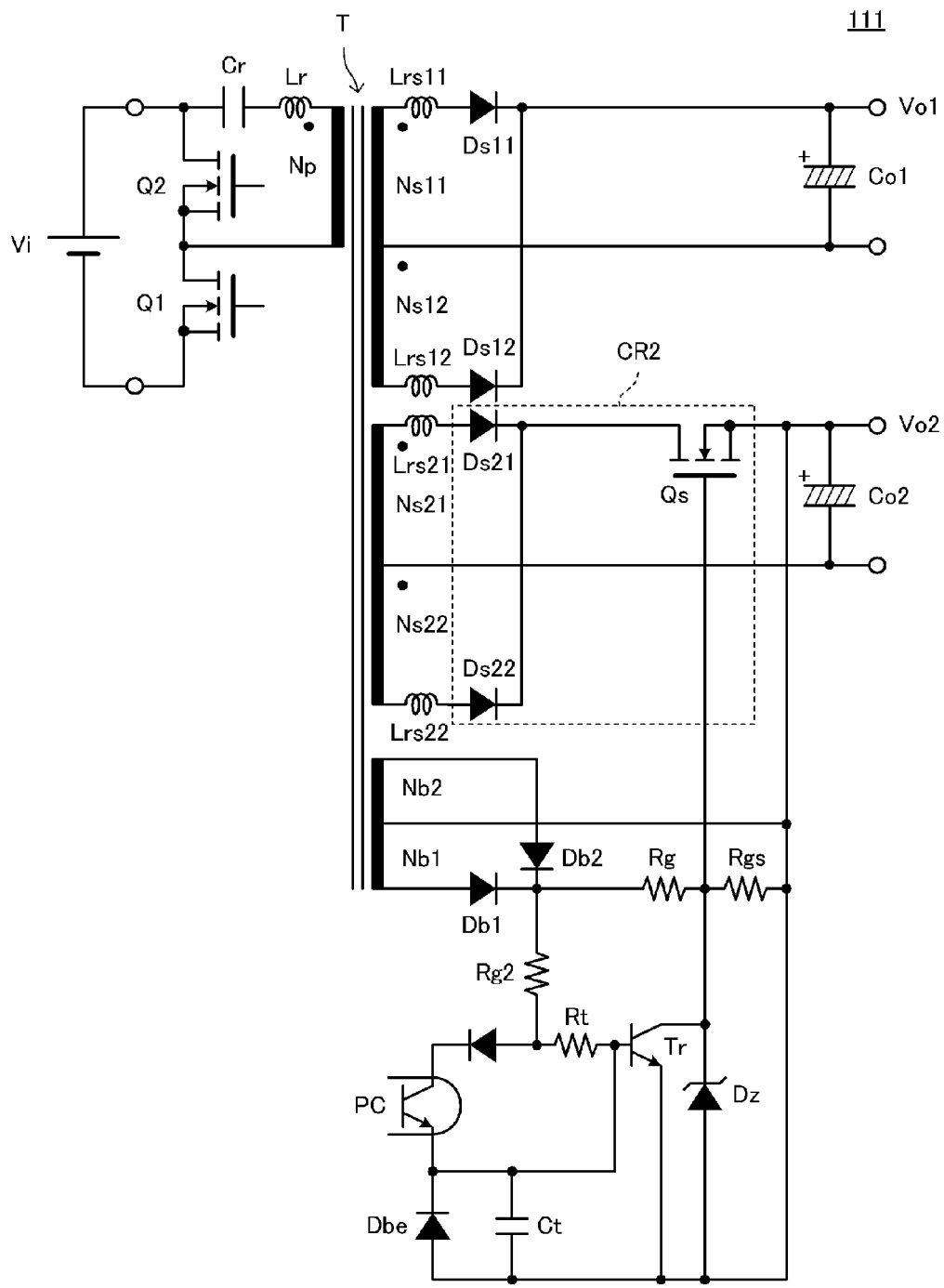
FIG. 13 is a circuit diagram of a switching power-supply circuit according to an eleventh preferred embodiment of the present invention.

FIG. 13 is the circuit diagram of a switching power-supply circuit 111 according to an eleventh preferred embodiment of the present invention. The switching power-supply circuit 111 is an example of a configuration in which a second rectifier circuit CR2 includes two diodes Ds21 and Ds22 and one rectifier switch element Qs, a configuration is provided to center-tap rectify the voltages of second secondary windings Ns21 and Ns22, and a second output voltage Vo2 is controlled by the second rectifier circuit CR2. In addition, this switching power-supply circuit 111 is an example of a configuration in which a transformer T includes drive windings Nb1 and Nb2 and the rectifier switch element Qs is controlled based on a center-tap rectified voltage signal. The remaining configuration is preferably the same or substantially the same as those illustrated in the second and third preferred embodiments.

According to the eleventh preferred embodiment, center-tap rectifier circuits are individually applied to first secondary windings Ns11 and Ns12 and the second secondary windings Ns21 and Ns22, and thus, it is possible to transmit energy from a primary side to a secondary side during the on-period of each of a first switching element Q1 and a second switching element Q2. Therefore, it is possible to reduce the size of a transformer.

In addition, it is possible to reduce ripple voltages in a first output voltage Vo1 and the second output voltage Vo2. Further, the same or substantially the same advantages as those described in the first and second preferred embodiments are achieved.

Twelfth Preferred Embodiment

Figure 14:
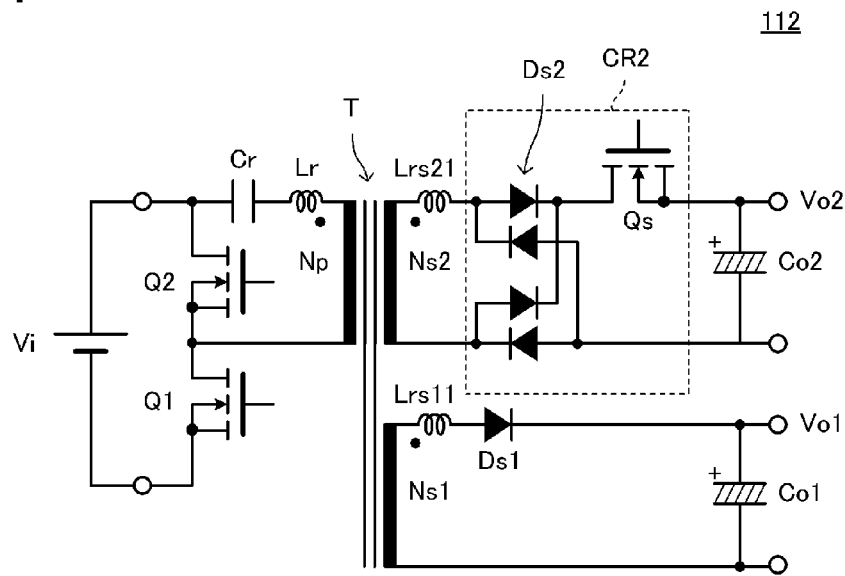
FIG. 14 is a circuit diagram of a switching power-supply circuit according to a twelfth preferred embodiment of the present invention.

FIG. 14 is the circuit diagram of a switching power-supply circuit 112 according to a twelfth preferred embodiment of the present invention. The switching power-supply circuit 112 is an example of a configuration in which a second rectifier circuit CR2 includes four diodes Ds2 and one rectifier switch element Qs, the voltage of a second secondary winding Ns2 is full-wave rectified to obtain an output voltage Vo2, and the output voltage Vo2 is controlled by a rectifier circuit CR2. The remaining configuration is preferably the same or substantially the same as that illustrated in the second preferred embodiment.

According to the twelfth preferred embodiment, it is possible for a first secondary winding Ns1 to transmit energy from a primary side to a secondary side during the on-period of each of a first switching element Q1 and a second switching element Q2, and it is possible to reduce the size of a transformer. In addition, it is possible to reduce a ripple voltage in each of a first voltage output and a second voltage output.

Since the voltage of the second secondary winding Ns2 is full-wave rectified, it is possible to further reduce a ripple voltage in the second output voltage Vo2.

Further, the same or substantially the same advantages as those described in the first and second preferred embodiments are achieved.

Thirteenth Preferred Embodiment

Figure 15:
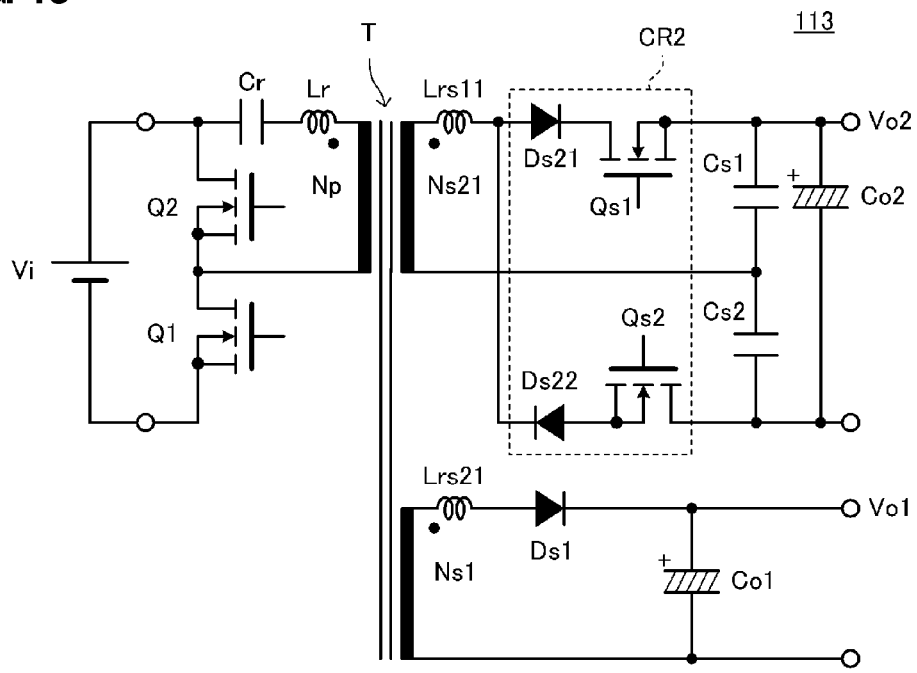
FIG. 15 is a circuit diagram of a switching power-supply circuit according to a thirteenth preferred embodiment of the present invention.

FIG. 15 is the circuit diagram of a switching power-supply circuit 113 according to a thirteenth preferred embodiment. The switching power-supply circuit 113 is an example of a configuration in which a second rectifier circuit CR2 includes two diodes Ds21 and Ds22 and two rectifier switch elements Qs1 and Qs2 and a second output voltage Vo2 is obtained by voltage-doubler rectifying the voltage of a second secondary winding Ns2. The remaining configuration is preferably the same or substantially the same as that illustrated in the second preferred embodiment.

According to the thirteenth preferred embodiment, since the voltage of the second secondary winding Ns2 is voltage-doubler rectified, energy is transmitted from a primary side to a secondary side during the on-period of each of a first switching element Q1 and a second switching element Q2, in a first secondary winding Ns1, and it is possible to reduce the size of a transformer. In addition, it is possible to reduce a ripple voltage in each of a first voltage output and a second voltage output.

Further, the same or substantially the same advantages as those described in the first and second preferred embodiments are achieved.

Fourteenth Preferred Embodiment

Figure 16:
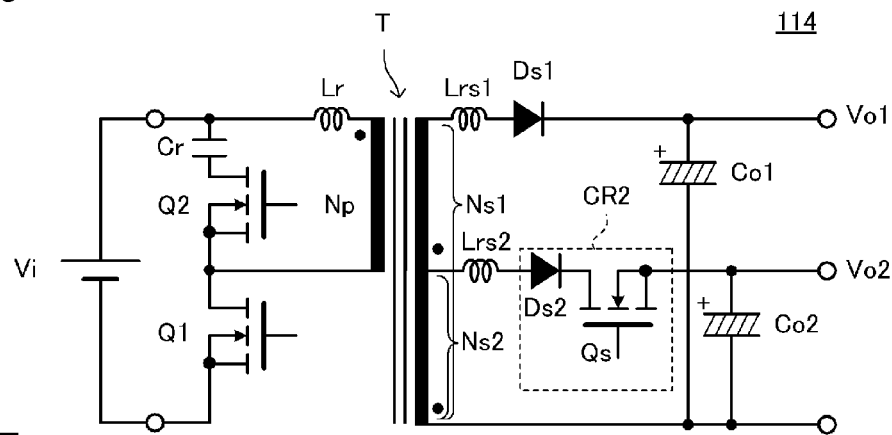
FIG. 16 is a circuit diagram of a switching power-supply circuit according to a fourteenth preferred embodiment of the present invention.

FIG. 16 is the circuit diagram of a switching power-supply circuit 114 according to a fourteenth preferred embodiment of the present invention. The switching power-supply circuit 114 is different from the circuits illustrated in the second to thirteenth preferred embodiments in the position of a resonance capacitor Cr on a primary side. In other words, a series circuit including the resonance capacitor Cr and a second switching element Q2 is connected in parallel to a series circuit including a primary winding Np and an inductor Lr.

While, in the second to thirteenth preferred embodiments, a half-bridge configuration is provided for the primary side of the transformer, such a topology as a flyback+active clamp circuit is provided in the fourteenth preferred embodiment. In other words, the second switching element Q2 functions as a clamp element, the excitation of a transformer T is forcibly reset, the occurrence of a high voltage is avoided, and a conversion efficiency is improved. Therefore, the control characteristic of an output voltage with respect to a change in an input voltage is improved.

Further, the same or substantially the same advantages as those described in the first and second preferred embodiments are achieved.

Fifteenth Preferred Embodiment

Figure 17:
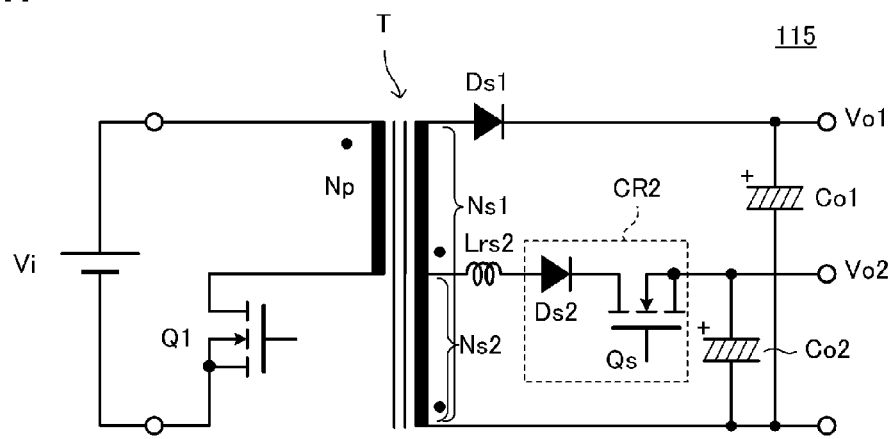
FIG. 17 is a circuit diagram of a switching power-supply circuit according to a fifteenth preferred embodiment of the present invention.

FIG. 17 is the circuit diagram of a switching power-supply circuit 115 according to a fifteenth preferred embodiment of the present invention. The switching power-supply circuit 115 is an example in which a flyback converter does not include a second switching element Q2 provided on the primary side of a transformer T.

According to the fifteenth preferred embodiment, since a single main switching element is provided, the fifteenth preferred embodiment is suitable for a small switching power-supply circuit whose current capacity is relatively low.

Sixteenth Preferred Embodiment

Figure 18:
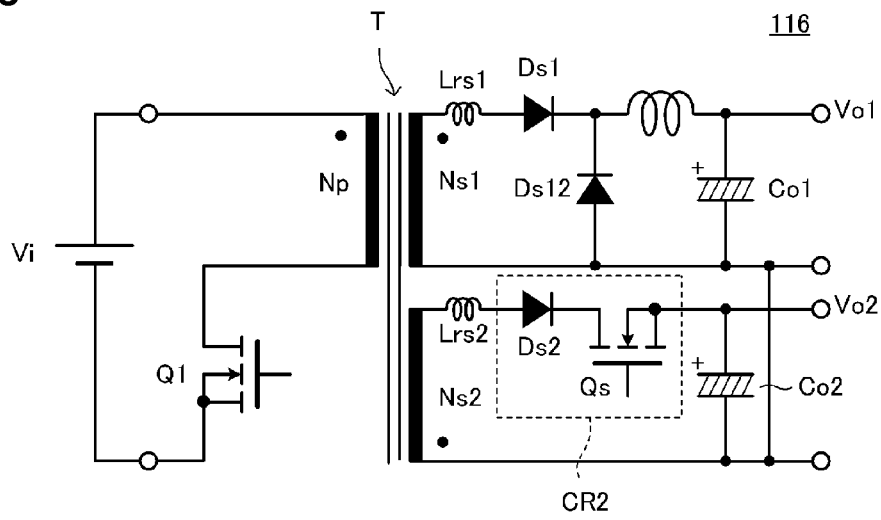
FIG. 18 is a circuit diagram of a switching power-supply circuit according to a sixteenth preferred embodiment of the present invention.

FIG. 18 is the circuit diagram of a switching power-supply circuit 116 according to a sixteenth preferred embodiment of the present invention. The switching power-supply circuit 116 is an example in which a forward converter does not include a second switching element Q2 provided on the primary side of a transformer T.

According to the sixteenth preferred embodiment, since a single main switching element is provided, the sixteenth preferred embodiment is suitable for a small switching power-supply circuit whose current capacity is relatively low.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power-supply circuit comprising:
   a transformer including a primary winding, a first secondary winding, and a second secondary winding;
   a first switching element connected in series to the primary winding;
   a first rectifying/smoothing circuit arranged to generate a first output voltage by rectifying and smoothing an output of the first secondary winding;
   a second rectifying/smoothing circuit arranged to generate a second output voltage by rectifying and smoothing an output of the second secondary winding;
   a first feedback circuit arranged to generate a feedback signal according to the first output voltage; and
   a switching control circuit arranged to control the first switching element based on the feedback signal and to stabilize the first output voltage; wherein
   a rectifier circuit in the second rectifying/smoothing circuit includes a rectifier switch element and a drive control circuit arranged to determine when an input voltage is greater than the second output voltage and the second output voltage is less than a predetermined voltage by comparing the second output voltage to a reference voltage, and cause the rectifier element to be conductively connected when the input voltage is greater than the second output voltage and the second output voltage is less than the predetermined voltage;
   the rectifier switch element operates by using a winding voltage occurring in one of the primary winding, the first secondary winding, and the second secondary winding of the transformer; and
   the rectifier circuit in the second rectifying/smoothing circuit is arranged to stabilize the second output voltage so as to achieve and maintain accuracy of the second output voltage, by controlling a number of pulses per unit time in a pulse current flowing through the rectifier circuit itself.

2. The switching power-supply circuit according to claim 1, wherein
the rectifier circuit in the second rectifying/smoothing circuit includes a second rectifying element that is connected in series to the rectifier switch element and causes a voltage of the second secondary winding to flow in a forward direction.

3. The switching power-supply circuit according to claim 1, wherein
the second rectifying/smoothing circuit includes a secondary-side inductor to delay a rise of a current flowing into the rectifier circuit in the second rectifying/smoothing circuit.

4. The switching power-supply circuit according to claim 3, wherein
the secondary-side inductor is defined by leakage inductance of the transformer.

5. The switching power-supply circuit according to claim 1, wherein
the rectifier circuit in the second rectifying/smoothing circuit includes a capacitor arranged to absorb a surge voltage and connected in parallel to the second rectifying element.

6. The switching power-supply circuit according to claim 1, wherein
when the rectifier circuit in the second rectifying/smoothing circuit is conductively connected, the drive control circuit causes the rectifier switch element to be conductively connected, using the winding voltage occurring in a winding of the transformer.

7. The switching power-supply circuit according to claim 6, wherein
the winding that generates the winding voltage is the second secondary winding of the transformer, which supplies a current used to obtain the second output voltage.

8. The switching power-supply circuit according to claim 7, wherein
the winding that generates the winding voltage is a drive winding provided on a secondary side of the transformer.

9. The switching power-supply circuit according to claim 8, wherein
the winding that generates the winding voltage includes two drive windings that are provided on the secondary side of the transformer and that have different polarities from one another.

10. The switching power-supply circuit according to claim 1, wherein
the first secondary winding and the second secondary winding have reverse polarities from one another.

11. The switching power-supply circuit according to claim 1, wherein
the first secondary winding includes two secondary windings including a center tap, and the first rectifying/smoothing circuit is a center-tap rectifying/smoothing circuit.

12. The switching power-supply circuit according to claim 1, wherein
the first rectifying/smoothing circuit is a voltage doubler rectifier circuit.

13. The switching power-supply circuit according to claim 1, wherein
the first rectifying/smoothing circuit is a full-wave rectifier circuit.

14. The switching power-supply circuit according to claim 1, wherein
the first secondary winding and the second secondary winding are separate windings that are insulated from each other.

15. The switching power-supply circuit according to claim 1, wherein
a plurality of the second secondary windings are included, and the second rectifying/smoothing circuit includes a plurality of rectifying/smoothing circuits connected to the plurality of secondary windings.

16. The switching power-supply circuit according to claim 1, wherein
when a current of a load to which the second output voltage is applied is small, the rectifier circuit in the second rectifying/smoothing circuit operates so as to restrict a conduction time-period of a forward current.

17. The switching power-supply circuit according to claim 1, wherein
the second secondary winding includes two secondary windings including a center tap, and the rectifier circuit in the second rectifying/smoothing circuit includes two diodes and one rectifier switch element and center-tap rectifies a voltage of the secondary winding.

18. The switching power-supply circuit according to claim 1, wherein
the rectifier circuit in the second rectifying/smoothing circuit is a full-wave rectifier circuit.

19. The switching power-supply circuit according to claim 1, wherein
the rectifier circuit in the second rectifying/smoothing circuit is a voltage doubler rectifier circuit.

20. The switching power-supply circuit according to claim 1, further comprising:
a second switching element connected to a position defining a closed loop in combination with the primary winding, wherein the switching control circuit alternately turns on and turns off the first switching element and the second switching element with a short dead time sandwiched therebetween.

21. The switching power-supply circuit according to claim 20, further comprising:
a resonance inductor provided in series with the primary winding; and
a resonance capacitor defining a resonant circuit in combination with the resonance inductor.

22. The switching power-supply circuit according to claim 21, wherein
a series circuit including the resonance capacitor and the second switching element is connected in parallel to a series circuit including the primary winding and the resonance inductor so as to define the closed loop.

23. The switching power-supply circuit according to claim 21, wherein
the resonance inductor is defined by leakage inductance of the transformer.

* * * * *